United States Patent [19]

Hathcock

[11] Patent Number: 4,671,156

[45] Date of Patent: Jun. 9, 1987

[54] DOBRO CAPO

[76] Inventor: Emmet L. Hathcock, Rte. 1, Box 182, Donaldson, Ark. 71941

[21] Appl. No.: 909,556

[22] Filed: Sep. 22, 1986

[51] Int. Cl.[4] .......... G01D 3/04

[52] U.S. Cl. .......... 84/318

[58] Field of Search .......... 84/318

[56] References Cited

U.S. PATENT DOCUMENTS

| | | | |
|---|---|---|---|
| 3,277,765 | 10/1966 | Miller et al. | 84/318 |
| 3,933,077 | 1/1976 | Dunlop | 84/318 |
| 3,971,287 | 7/1976 | Ito | 84/453 |

FOREIGN PATENT DOCUMENTS

| | | | |
|---|---|---|---|
| 3003402 | 8/1981 | Fed. Rep. of Germany | 84/318 |

*Primary Examiner*—Lawrence R. Franklin
*Attorney, Agent, or Firm*—Stephen D. Carver

[57] ABSTRACT

A low profile capo for a stringed musical instrument having elevated strings such as dobro or the like. The capo comprises an elongated, rigid, bar-like frame adapted to be disposed over the top of the strings above the instrument neck. A pair of integral, elongated frame ridges which are offset from the recessed bottom frame surface provide definitive metal-to-metal contact with the dobro strings. Since the frame ridges establish a definitive point of contact across the strings above the neck, the strings are allowed, if not forced, to resonate at an elevated frequency without dampening of the resultant sound amplitude or quality. A cooperating compression arm assembly is adapted to swing in or out of operative position about a pivot point defined upon one end of the frame. The arm comprises a coaxially encircling, resilient sheath, preferably formed of rubber, polyethylene or the like, which is adapted to firmly engage and substantially surround at least a portion of the strings. The arm is deployed by rotating it into substantial alignment with the frame under the instrument strings, whereupon an associated clamp is closed to firmly urge the arm, and the surrounding sheath, upwardly towards the strings for constraint against the capo frame.

20 Claims, 8 Drawing Figures

DOBRO CAPO

BACKGROUND OF THE INVENTION

The present invention relates generally to capotasto devices for varying the resonant length of tensioned strings on stringed musical instruments such as a dobro, banjo, Hawaiian guitar, or the like. More particularly, this invention relates to a unitary, self-locking capo device which firmly engages the strings of the instrument operatively independently of the neck of the instrument. The invention is believed to be classified in U.S. Class 84, Subclass, 318.

The typical dobro is somewhat similar in appearance to a standard or classical guitar, and generally comprises a hollow body portion with a metallic acoustic panel, an elongated neck portion, which terminates in a tuning head, and six tensioned strings which are tuned to an open G-major chord. Typically, dobro strings are comprised of heavier gauge wire than standard guitar strings and are therefore substantially less flexible. More importantly, the strings of the typical dobro are positioned well above the fretboard on the neck of the instrument, so that the distance between the dobro string the the fretboard is much greater on a dobro than on a standard guitar. Moreover, the neck of the dobro is wider than the neck of a standard guitar. The dobro is generally held in a "flat" position across the lap of the player or on a strap, so that the neck and strings of the instrument are horizontal, approximately perpendicular to the player's body.

The skilled player does not finger the individual strings of the dobro to form a desired chord, but simply dampens or compresses various strings with a solid slide or similar bar at the appropriate position across a fret with one hand while strumming or plucking the strings with the other hand. The dobro is typically tuned to an "open tuning", which means that a major chord (usually G major) is played when all the strings are strummed together. As will be appreciated by skilled musicians familiar with the dobro or similar stringed folk instruments, a capo device is frequently desired in order to vary the pitch of the instrument when a change of key is desired for a particular song.

A number of prior art capo devices have been introduced which are suitable for use with a standard guitar. Generally, such prior art capos lockingly engage about the circumference of the neck and compress the guitar strings to the fretboard at the desired fret position.

One representative prior art guitar capo is disclosed by Myerson et al., U.S. Pat. No. 4,252,046, issued Feb. 24, 1981. The device includes a flexible, elastic band which encircles the neck of the guitar and can be selectively tensioned to engage a rigid shaft to compress the strings to the fretboard. Similar flexible bands are employed in capos described in U.S. Pat. No. 1,788,636, issued to Russell on Jan. 13, 1931; Wowries, U.S. Pat. No. 3,504,589, issued Apr. 7, 1970; U.S. Pat. No. 3,933,077, issued Jan. 20, 1976 to Dunlop; and, Labbe, U.S. Pat. No. 4,503,747.

Another type of adjustable prior art guitar capo is shown in U.S. Pat. No. 4,250,790, which comprises a rigid jaw member which clamps about the neck and strings of the instrument and is adjusted by means of a screw. Similarly screw-adjustable capos are found in U.S. Pat. Nos. 3,933,073; 4,324,165; 4,270,432; and 4,104,947. A number of rigid, pivotally clamping capos are also known in the prior art, of which U.S. Pat. Nos. 4,143,576; 4,149,443; and 4,583,440 are representative.

None of the prior art capos known to me, however, is of particular value to the dobro player. Because the neck of the dobro is generally wider than the neck of a standard guitar, it is difficult to fit a guitar capo to the dobro. Also, since the strings of the dobro are positioned at a substantially greater distance above the fretboard than they would be on the guitar, it is impractical if not impossible to "capo" a dobro by pressing the string down into contact with a fret upon the fret board.

The most obvious disadvantage of using a typical guitar capo for a dobro is that the sound produced when the capo is in place is not "true". The object of using a capo is to most closely approximate the sound produced when an "open" chord is played. If the strings of a dobro were to be tightly clamped against the fretboard, the natural resonance and resilience of the strings would be greatly reduced. Thus, the sound is greatly dampened and, particularly, the unique bass tones produced by the dobro in open tuning would be lost.

Another major disadvantage is encountered with the placement of the conventional guitar capo on the dobro neck. Typically, the adjustment nut or some portion of the guitar capo extends above the surface of the strings and/or to the side of the neck. When the skilled dobro player attempts to maneuver the slide bar along the horizontal surface of the dobro strings to form a desired chord, the capo structure will interfere with the player's hand or arm movement. This is particularly vexatious when the desired chord is formed closed to the capo.

It is therefore desirable to provide a capo which is adapted to be compressively fitted directly upon the strings of the dobro to permit the full natural resonance of the strings and to minimize interference with the player's hand and arm movements.

Some suggestion for so compressing the strings of an instrument independent of the neck is made by Ito in U.S. Pat. No. 3,971,287, issued July 27, 1976. The sound dampening device described therein comprises a pair of rigid, cooperating hinge portions lined with a resilient, spongy material to reduce the natural resilience of the strings. No suggestion is made therein as to the possible advantage of effectuating a key change by selective placement of the device relative to the fretboard.

SUMMARY OF THE INVENTION

The present invention comprises a capo for effectuating a key change on a stringed musical instrument such as dobro, banjo, steel guitar or the like. The instant capo is ideally adapted for a dobro which may be quickly clamped into position upon the elevated dobro strings and which presents a low profile so as to minimize or prevent interference with either of the hands of the musician.

The preferred capo comprises an elongated frame in the shape of bar which is adapted to be disposed over the top of the strings above the neck of the dobro. The bar preferably comprises a pair of elongated ridges which are offset from an inner recessed bottom surface of the bar and which provide definitive metal-to-metal contact with the dobro strings. Since the frame establishes a definitive point of contact across the strings above the neck, the strings are allowed, if not forced, to resonate at an elevated frequency without dampening of the resultant sound amplitude or quality.

Preferably the frame includes a cooperating compression arm assembly which swings in or out of operative position about a pivot point defined upon one end of the bar. This arm includes a coaxially surrounding resilient sheath, preferably formed of rubber, polyethylene or the like, which is adapted to firmly engage and substantially surround at least a portion of the strings. The arm is deployed by rotating it into substantial alignment with the frame, whereupon an associated clamp is closed to firmly urge the arm, and the surrounding sheath, upwardly towards the strings and the frame.

The resultant compressive action between the frame and the arm forces the sheath into substantially surrounding contact with the strings, urging at least a portion of the width of the strings upwardly into the recessed frame bottom surface. In this manner a definitive point of contact between the adjacent frame ridges and the strings is established. Importantly, the frame bar is of extreme thin dimensions, and it does not include any form of obstructive structure such as upper clamps, upwardly projecting wing nuts or the like. The resultant low profile configuration greatly facilitates use of the device by the musician, who may now fret chords even though his hand and his slide bar will be positioned close to the capo (i.e. the "open" chord).

Thus, a broad object of the present invention is to provide a low profile capo for a stringed musical instrument such as a dobro or the like which is adapted to compressively clamp about the strings without engaging the neck of the instrument.

A further broad object of the present invention is to provide a capo which is adapted to compressively surround the strings of a dobro to effectuate a key change without interfering with the hand or arm movement of the musician during play.

Another object of the invention is to provide a capo which is adapted to engage the strings of a dobro to effectuate a key change without dampening the natural resonance of the strings so as to color the sound of the instrument.

A similar object of the invention is to provide a reliable capo which, when deployed, will not detune the instrument strings.

Yet another broad object of the present invention is to provide a cap of the type described which can be easily and quickly deployed upon or removed from the instrument.

A similar broad object of the present invention is to provide a unitary dobro cap which is adapted to lockingly engage the strings of the instrument.

A still further object of the present invention is to provide a low profile capo of streamlined dimensions without upwardly extending portions, so that the musician may easily and conveniently strike a chord position close to the capo without striking the capo.

Another object is to provide a capo with a dependable clamping system characterized by over center action for rigidly securing the capo on the strings.

Yet another fundamental object of the present invention is to provide a low profile capo of the character described which may be dependably employed upon dobro or other stringed musical instruments having strings substantially elevated above the neck.

Another fundamental object of the present invention is to provide a dependable capo which avoids dampening the sound from the strings.

Another object is to provide a capo of the character described, including a latch or clamping device which can break over (i.e. be removed) without taking the cap off of the dobro (or other musical instrument).

A still further fundamental object of the present invention is to provide a capo which, when in use, realistically emulates the sound of an open chord.

Yet another fundamental object of the present invention is to provide a capo of the character described which does not attenuate bass response.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
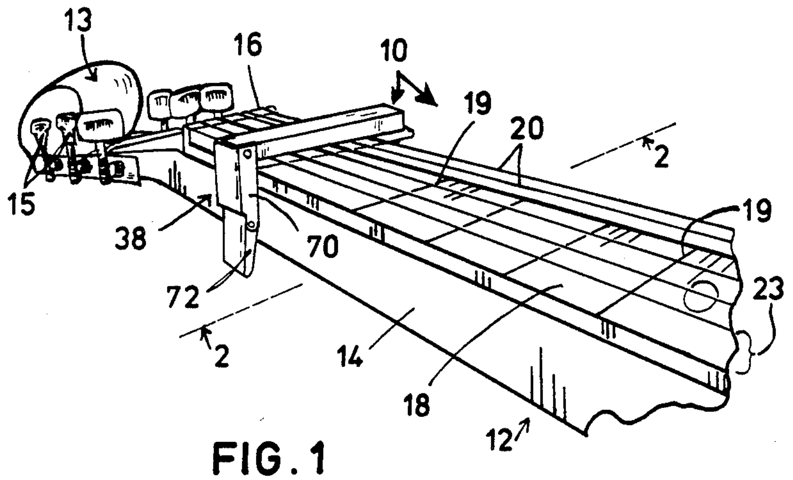
FIG. 1 is a fragmentary, pictorial view of the upper neck of a stringed musical instrument such as a dobro or the like, with the present invention properly installed.

With initial reference now directed to FIGS. 1 through 6 of the appended drawings, a capo constructed in accordance with the best mode of the teachings of the present invention has been generally designated by the reference numeral 10. Capo 10 is ideally adapted to be used in conjunction with a stringed musical instrument such as the partially illustrated, conventional dobro indicated generally by the reference numeral 12.

It will be recognized by those skilled in the art that the dobro 12, like most stringed musical instruments, includes a rigid elongated neck 14 which extends from a resonant usually hollow body (not shown), and a conventional head 13 provided with a plurality of tuning keys 15 for tensioning the strings 20 to properly tune the instrument 12. The strings extend over nut 16 to the various tuning keys 15. A plurality of spaced apart conventional frets 19 are disposed at predetermined intervals transversely across free board 18.

As will be recognized by those skilled in the music arts, a plurality of strings, generally indicated by the reference numeral 20, are disposed above the fret board 18 in generally parallel spaced apart relation for the playing of music in the usual manner. In the case of the dobro, and as indicated best in FIGS. 1 and 6, strings 20 are elevated above the fret board 18 a distance 23 which is substantially greater than the distance provided in such instruments as guitars, banjos or the like. In normal operation the strings of a dobro are not depressed by the musician onto the fret board; instead, resonant chords are selected by a metallic slide bar usually operated by the left hand of the musician, and musical notes may be "picked" by his right hand. Normally the strings of a dobro are sequentially tuned to an open G major chord consisting of the notes G, B and D. After capo 10 is installed properly upon the dobro, the resultant "open" chord will be of a higher pitch, and thus "open" chords such as A major, B flat major and the like may be selected.

Figure 2:
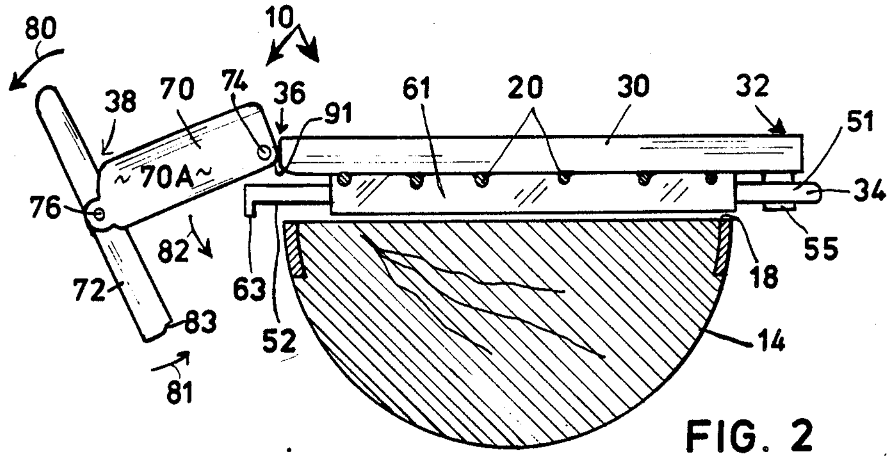
FIG. 2 is an enlarged, fragmentary, sectional view taken generally along line 2—2 of FIG. 1, but illustrating the clamp of the instant capo in an unfastened position.
Figure 3:
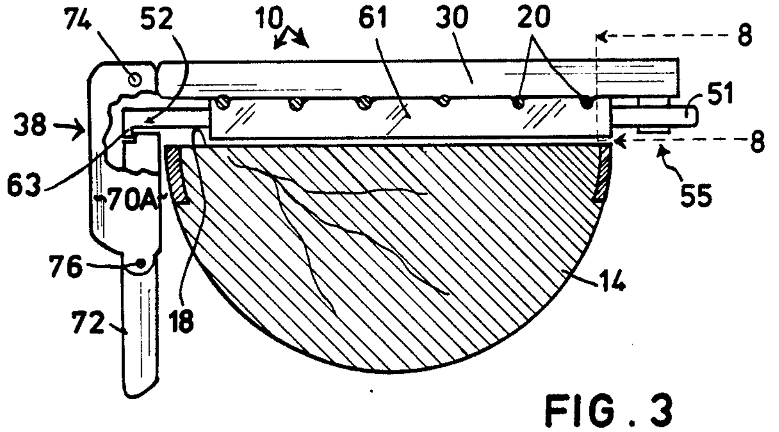
FIG. 3 is an enlarged, fragmentary, sectional view similar to FIG. 2, but illustrating the capo properly fastened upon the strings.
Figure 4:
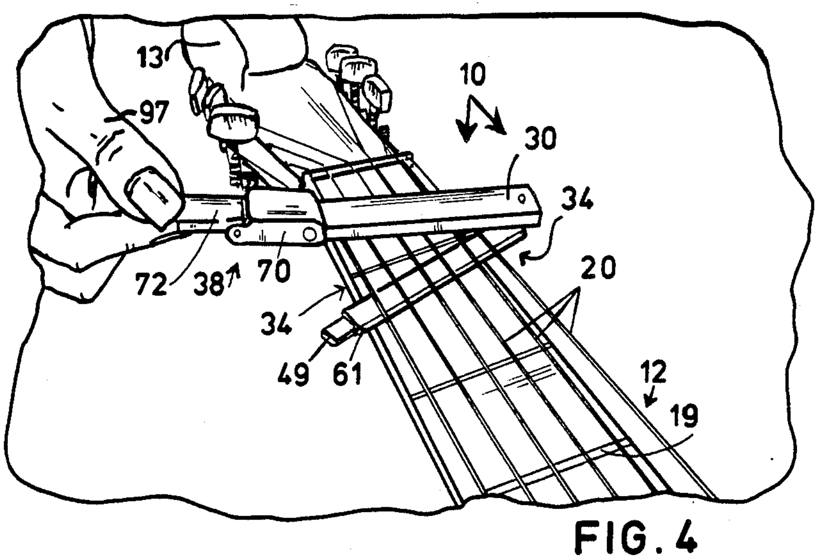
FIG. 4 is a fragmentary, pictorial view of a dobro illustrating how the instant capo is first installed.

In the best mode the capo 10 includes a rigid, elongted frame 30 is in the form of a flat, elongated bar of generally rectangular cross section. Frame 30 preferably includes a first end generally designated by the reference numeral 32 to which a cooperating arm assembly 34 is pivotally connected, and an opposite or second end generally designated by the reference numeral 36 to which a clamping assembly 38 is hingeably attached. As best seen in FIGS. 2 and 3, the dobro capo 10 may be attached over the fret board 18 to the strings by proper manipulation of the clamping apparatus 38 and the associated arm assembly 34 without mechanically contacting the dobro neck 14.

Figure 8:
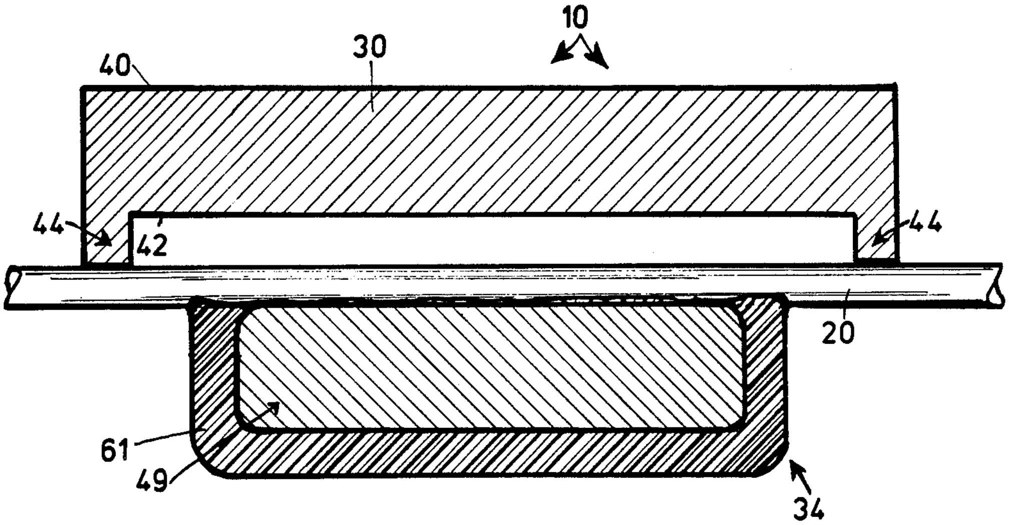

The frame 30 is of low profile proportions, and it includes a generally rectangular, flat upper surface 40 which is spaced apart from a lower, recessed bottom surface 42 (FIG. 8). It will be noted that upper surface 40 presents no physical or structural obstructions or impediments to the hands 97, 99 (FIG. 6) of the musician. It will also be apparent that the recessed bottom surface 42 is integrally defined upon frame 30 beneath and parallel to the top 40. Integral with the frame 30 and defined in spaced-apart, parallel relation on opposite sides of the bottom surface 32 are a pair of rigid, elongated rigdes 44 which generally extend between frame ends 32 and 36. As will be discussed later in conjunction with FIG. 8, the purpose of ridges 44 are to definitively contact the usually-metal dobro strings 20 so as to acoustically provide a harmonically full, resonant-sounding chord of raised pitch, the amplitude of which is undampened.

The arm assembly 34 is adapted to cooperate with the frame 30 and its purpose is to compressively engage the strings 20 at their underside. The elongated rigid compression arm assembly 34 comprises a rigid, elongated preferably metallic brace 49. Brace 49 is somewhat flat, being of generally rectangular cross section (FIG. 8) and preferably it is of substantially the same length as the frame 30. It includes a first end 51 pivotally coupled to end 32 of the frame 30. To this effect it will be noted that end 51 is pivotally secured to bar end 32 via a conventional screw 55. The second end 52 of the arm member 49 is provided with an L-shaped notch or tooth 63 which is adapted to be engaged by the clamping assembly 38 to firmly compressively attach the capo about the strings 20, thereby suspending it above the fret board 18 without contact with the neck 14.

It will be noted from FIGS. 2 and 3 that a slight gap exists between the underside of the sheath 61 and the fret board 18, and that no parts of the capo assembly 10 physically contact the neck or the fret board. It will also be appreciated from an inspection of FIGS. 2 and 3 that the frame means 30 occupies a first hypothetical plane which is spaced apart from and generally parallel with a lower or second hypothetical plane occupied by the rigid arm member 49.

Preferably, a resilient, tubular sheath 61 is associated with the compression arm assembly 34, being coaxially disposed upon brace 49 about a major portion of its length. Sheath 61 is preferably formed of a resilient, wear resistant material such as rubber, polyethylene or the like. The purpose of the sheath 61 is to substantially surround a portion of the strings 20 when the capo is installed (FIGS. 2 and 3), and to capture and urge this portion of the strings 20 up into the recess defined between rigdes 44 and the recessed bottom frame surface 42 (FIG. 8). Noises or harmonics which would otherwise be generated by that portion of the string captured between ridges 44 (FIG. 8) will be substantially attenuated, if not altogether eliminated by the dampening action of the resilient sheath 61. However, the definitive metal to metal contact caused by ridges 44 which touch the strings 20 insures that a resonant and rich natural sounding chord will be produced with the capo installed.

Figure 7:
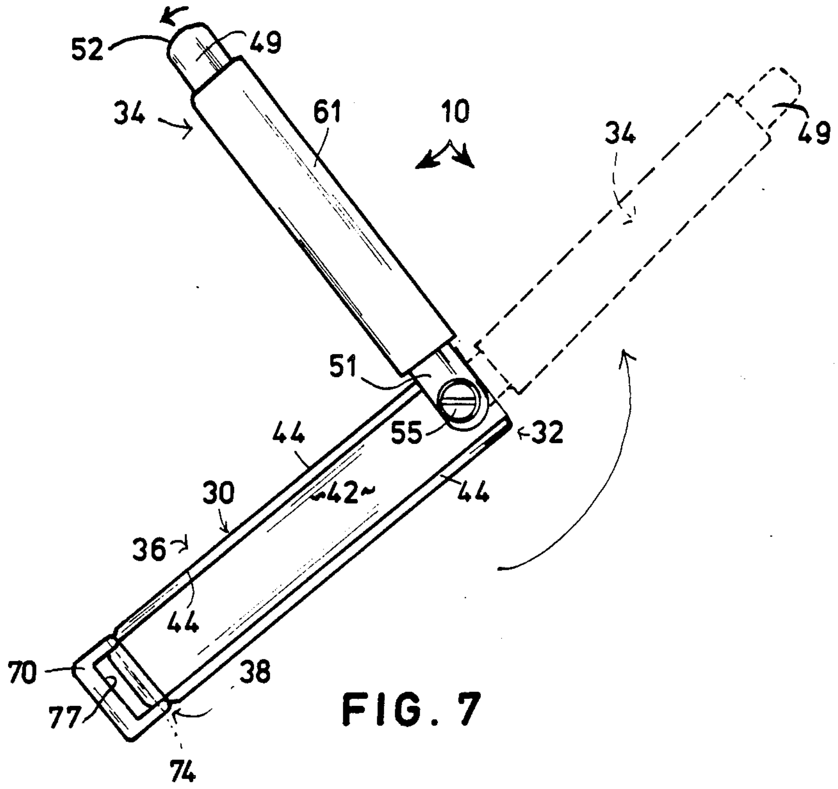
FIG. 7 is an enlarged, fragmentary bottom plan view of the instant capo, illustrating how the compression arm may be pivoted, and illustrating the ridges and the bottom recessed surface of the frame; and, FIG. 8 is a greatly enlarged, fragmentary, sectional view taken generally along line 8—8 of FIG. 3.

Clamping means 38 preferably comprises a channel portion 70, of a generally box-like configuration which is pivotally connected to the second end 36 of the frame 30 via an elongated hinge pin 74. Channel member 70 is similarly hingeably coupled at juncture 76 substantially midway between the body of a rigid clasp member 72 which is adapted to be rotatably coupled to the arm end 52 previously discussed. As will be appreciated from a comparison of FIGS. 2 and 3, the clamping apparatus 38 may be rotated relative to the capo frame 30 in the direction generally of arros 80, 81 and 82 (FIG. 2) so as to deploy both the channel portion 70 and the clasp portion 72 of the clamping apparatus 38 is the substantially vertically aligned position illustrated in FIG. 3. With the clamp installed as viewed in FIG. 1, the outer sides 70A of the channel portion 70 will substantially surround the narrower clasp 72 which is neatly received within the recess 77 (FIG. 7) of the channel portion.

As best viewed in FIGS. 2 and 3, the remote end 62 of the arm member brace 49 includes a notch 63 which is adapted to be contacted and captured by a similarly configured notch 83 (FIG. 2) defined in the clamping clamp. Importantly, as the clasp 72 is rotated about hinge point 76, so as to move its notch 83 into contact with arm tooth 63, it will be rotated through an over center position so as to be stably disposed in the locked position of FIG. 3. As best viewed in FIGS. 2 and 3, the shoulder 91 defined at end 36 of frame 30 abuts the edge of the clamp channel portion 70 to substantially limit its travel.

Figure 5:
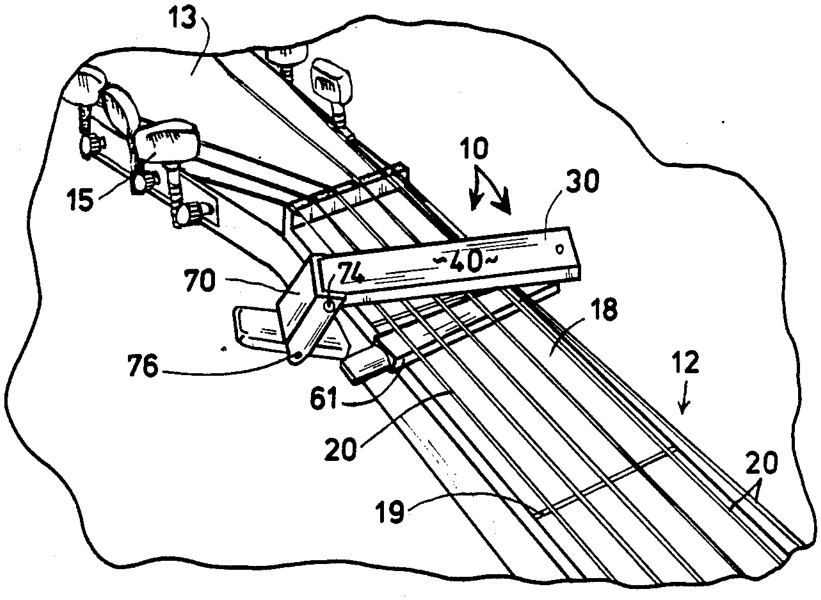
FIG. 5 is a view similar to FIG. 4, but illustrating the capo prior to clamping.
Figure 6:
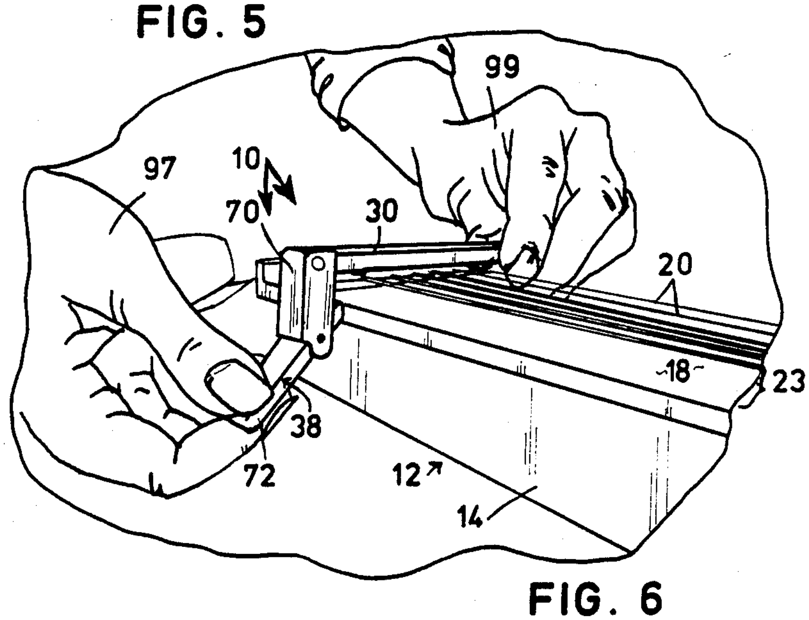
FIG. 6 is a fragmentary pictorial view similar to FIGS. 4 and 5 but illustrating the capo in proper place upon the neck of the instrument immediately prior to fastening of the clamp system.

In operation capo 10 may be installed upon the musical instrument as indicated in either FIG. 1–6, or it may be fastened in an opposite orientation. Chords are generally established by the proper positioning of the capo 10 relative to the appropriate underlying reference fret along the length of the fret board 18, as will be appreciated by those skilled in the musical arts. Once the arm assembly 34 is properly slid underneath the array of strings 20, the clamping assembly 38 may be revolved into an appropriate locking position as indicated generally in FIGS. 2 and 3. Preferably the right hand 97 of the musician may gently revolve the clamping assembly to the position in FIG. 6, with the arm assembly 34 positioned substantially as illustrated in FIG. 5. In this manner subsequent manual manipulation of the clamping clasp 72 will revolve it relative to the clamp channel portion 70 such that the notch 83 (FIG. 2) previously described will capture tooth 63 associated with the arm means 34. The preferred end position is illustrated in FIG. 3.

It will also be apparent that the capo 10 does not need to be completely removed from the dobro when a new base chord position is to be attained. Instead, the clasp 72 need merely be loosened somewhat and the entire capo may be slide axially along the neck into the desired operative position. It should also be apparent, that, particularly in the case of a dobro, since operation of the capo 10 does not mechanically involve contact with the fret board 18 or the frets 19, the musician is not limited to establishment of incremental chords ordinarily established by the reference frets 19. As will be recognized by those skilled in the art, this feature is facilitated by the fact that the strings of a dobro are not forced into contact with the cooperating frets 19.

Further, it will be appreciated that rotation of the clamping apparatus, and in particular the clasp 72, results in the production of an over center action. This is because of the relative positions of the pivot points 74, 76 (FIG. 3), and it is desirable that the clamping apparatus 38 tend to maintain itself in a yieldably fixed position once the capo 10 is adequately deployed.

Once the capo is properly installed as illustrated, the instrument strings may be vigorously "picked" as desired by the musician. Since the frame ridges 44 definitively forcibly contact the strings, preferably affording direct metal to metal contact with them, a loud, resonant, and pleasing tone of generally raised fundemental pitch will be properly produced, attendant with a variety of desired harmonics. On the other hand, those unwanted noises generated by conventional capos will be greatly attenuated if not altogether eliminated by virtue of the resilient sheath 61 which contacts, braces and surrounds the strings 20 (FIGS. 2, 3) within the limited region defined between ridges 44 and bottom frame surface 42.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A capo for a dobro or similar stringed musical instrument of the type having an elongated neck, and a plurality of generally parallel, spaced-apart strings extending along and above said neck, said capo comprising:

bar means adapted to be disposed on top of said strings over said neck, said bar means comprising a recessed bottom surface and ridge means extending generally coextensive with the length of said bar means adjacent said recessed bottom surface for definitively mechanically contacting said strings to force them to resonate loudly without dampening them;

arm means associated with said bar means for sandwiching said strings, said arm means comprising an elongated rigid portion operatively coupled to said bar means and resilient sheath means substantially coaxially surrounding at least a portion of said rigid portion for firmly engaging at least a portion of said strings and urging said last mentioned portion toward said recessed bottom surface of said bar means in response to deployment of said arm means; and, clamp means operatively associated with said bar means for selectively engaging said compression arm means to deploy said capo.

2. The capo as defined in claim 1 wherein said bar means comprises a first end spaced apart from a second end, said recessed bottom surface extends between said first and second ends; and, said ridge means comprises a pair of integral, elongated, parallel offset ridges disposed upon opposite sides of said bottom surface for firmly contacting said strings when said capo is deployed.

3. The capo as defined in claim 2 wherein said arm means comprises a first end operatively pivotally coupled to said first end of said bar means and a second end adapted to be engaged by said clamp means.

4. The capo as defined in claim 1 wherein said clamp means comprises:

channel means pivotally associated with the said second end of said bar means for revolving said clamp means relative to said bar means; and, clasp means pivotally associated with said channel means for selectively firmly engaging said arm means.

5. The capo as defined in claim 4 wherein said clasp means is adapted to be pivoted over center to securely temporarily lock said capo in an operative position upon said strings.

6. The capo as defined in claim 5 wherein at least a portion of said clasp means is operationally received within said channel means when said clamp means is properly activated.

7. The capo as defined in claim 4 wherein said second end of said arm means is provided with a tooth, and said clasp means comprises a notch adapted to selectively forcibly capture said tooth of said arm means when said clamp means is properly deployed to secure said capo to said strings.

8. The capo as defined in claim 4 wherein said bar means generally occupies a first hypothetical plane, said arm means generally occupies a second hypothetical plane, and said first and second hypothetical planes are substantially parallel with one another.

9. The capo as defined in claim 8 wherein said arm means is of substantially the same length as said bar means.

10. The capo as defined in claim 4 wherein said bar means second end includes a shoulder adapted to contact said channel means to operationally urge said channel means into a substantially vertical position.

11. A low profile capo for a dobro or similar stringed musical instrument of the type having an elongated neck, and a plurality of generally parallel, spaced-apart strings extending along and above said neck, said capo comprising:

an elongated, rigid, bar adapted to contact the top of said strings, said bar comprising a nonobstructive, flat top, a first end spaced apart from a second end, and a pair of spaced apart, elongated, generally parallel bottom ridges generally coextensive with the length of said bar and separated from one another by a recessed generally planar bottom surface;

an elongated, rigid, compression arm adapted to be operationally disposed underneath said strings generally parallel to and below said bar, said arm having a first end operatively pivotally coupled to said first end of said bar, and said arm terminating in a spaced-apart second end;

a resilient, deformable sheath substantially coaxially surrounding said compression arm and disposed between the first arm end and the second arm end, said sheath adapted to urge at least a portion of said strings toward said bottom surface when said capo is installed; and, a clamp operatively associated with said bar end for selectively engaging said second end of said compression arm to forcibly sandwich said strings between said resilient sheath and said generally planar bottom surface whereby said capo will be firmly attached to said strings without mechanical contact with said neck, and said strings will be disposed in definitive contact with said ridges.

12. The capo as defined in claim 11 wherein said clamp comprises:

a channel portion pivotally coupled to the second end of said bar by a hinge; and, a clasp portion pivotally coupled to said channel portion and adapted to be pivoted over center relative to said hinge to securely temporarily lock said capo in an operative position upon said strings.

13. The capo as defined in claim 12 wherein said second end of said arm is provided with a tooth, and said clasp comprises a notch adapted to selectively forcibly capture said tooth of said arm when said clamp is properly deployed.

14. The capo as defined in claim 13 wherein at least a portion of said clasp is operatively received within said channel portion when said clamp is activated.

15. The capo as defined in claim 14 wherein said bar generally occupies a first hypothetical plane, said arm generally occupies a second hypothetical plane, and said first and second hyothetical planes are substantially parallel with one another.

16. The capo as defined in claim 15 wherein said arm is of substantially the same length as said bar.

17. The capo as defined in claim 16 wherein said bar second end includes a shoulder adapted to contact said clamp channel portion to operationally urge said channel portion into a substantially vertical position.

18. A capo for a stringed musical instrument such as a dobro or the like, said capo comprising:

a rigid frame adapted to be disposed upon said instrument, said frame comprising a nonobstructive, flat top, a first end spaced apart from a second end, and a pair of spaced apart, elongated, generally parallel bottom ridges generally coextensive with the length of said frame and separated from one another by a recessed generally planar bottom surface;

an elongated, rigid, compression arm adapted to be operationally disposed underneath said strings generally parallel to and below said frame, said arm having a first end operatively coupled to said first end of said frame and said arm terminating in a spaced-apart second end;

a resilient, deformable sheath substantially coaxially surrounding said compression arm and disposed between the first arm end and the second arm end, said sheath adapted to urge at least a portion of said strings toward said bottom surface when said capo is installed; and, a clamp operatively associated with said frame second end for selectively engaging said second end of said compression arm to forcibly sandwich said strings between said resilient sheath and said generally planar bottom surface whereby said capo will be firmly attached to said strings without mechanical contact with said neck, and said strings will be disposed in definitive mechanical contact with said ridges, said clamp comprising:

a channel portion pivotally coupled to the second end of said frame by a hinge; and, a clasp portion pivotally coupled to said channel portion and adapted to be pivoted over center relative to said hinge to securely temporarily lock said capo in an operative position upon said strings.

19. The capo as defined in claim 18 wherein said second end of said arm is provided with a tooth, said clasp comprises a notch adapted to selectively forcibly capture said tooth of said arm when said clamp is properly deployed, and at least a portion of said clasp is operationally received within said channel portion when said clamp is activated.

20. The capo as defined in claim 19 wherein said frame second end includes a shoulder adapted to contact said clamp channel portion to operationally urge said channel portion into a substantially vertical position.

* * * * *